US006594674B1

(12) United States Patent
Kaplan et al.

(10) Patent No.: US 6,594,674 B1
(45) Date of Patent: Jul. 15, 2003

(54) SYSTEM AND METHOD FOR CREATING MULTIPLE FILES FROM A SINGLE SOURCE FILE

(75) Inventors: Keith S. Kaplan, Bothell, WA (US); Daniel E. Lovinger, Seattle, WA (US); A. Perry Clarke, Bellevue, WA (US); Neil R. Kaethler, Bellevue, WA (US); L. Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 168 days.

(21) Appl. No.: 09/605,555

(22) Filed: Jun. 27, 2000

(51) Int. Cl.$^7$ .................................................. G06F 7/00
(52) U.S. Cl. .................................................. 707/104.1
(58) Field of Search ........................ 707/101, 9, 501.1; 355/18; 235/454; 347/86

(56) References Cited

U.S. PATENT DOCUMENTS

| | | | | |
|---|---|---|---|---|
| 5,371,885 A | * | 12/1994 | Letwin | 707/205 |
| 5,664,178 A | * | 9/1997 | Sinofsky | 707/100 |
| 5,787,445 A | * | 7/1998 | Daberko | 707/205 |
| 5,873,118 A | * | 2/1999 | Letwin | 711/156 |
| 6,070,174 A | * | 5/2000 | Starek et al. | 707/206 |
| 6,078,924 A | * | 6/2000 | Ainsbury et al. | 707/101 |
| 6,185,575 B1 | * | 2/2001 | Orcutt | 707/200 |

* cited by examiner

Primary Examiner—Safet Metjahic
Assistant Examiner—Dana Al-Hashemi
(74) Attorney, Agent, or Firm—Law Offices of Albert S. Michalik, PLLC (57) ABSTRACT

A mechanism is provided that allows an application program to write, as a single file, a large block of data comprising multiple portions that could otherwise be written as several smaller files, then to access, as individual files, each of the portions within the large block of data, and to be able to create individual files efficiently out of each of these subfiles. The mechanism may be partially embodied in a file system that includes an information store defining each file on a volume. The application program writes, via the file system, a single file to the volume as (preferably) a contiguous block of data. The single file includes two or more separable streams of data capable of being stored as individual files (subfiles). Once the single file is written to the volume, multiple entries are made to the information store. Each entry defines and points to a subfile within the single file. The subfiles may be positioned within the single file such that the beginning of each subfile lies on the beginning of an allocation unit. In this manner, the single file may be written to the volume in one efficient operation, yet each subfile is individually accessible via its respective entry in the information store.

40 Claims, 6 Drawing Sheets

| Standard Information (R/W, Time Stamps, etc.) | File Name | Security Descriptor | Data (Pointers to Subfiles Stored on Disk) |
|---|---|---|---|

FIG. 6

SYSTEM AND METHOD FOR CREATING MULTIPLE FILES FROM A SINGLE SOURCE FILE

FIELD OF THE INVENTION

The present invention relates to electronic information storage. More specifically, the invention relates to the storage of electronic information on non-volatile media.

BACKGROUND OF THE INVENTION

Although disk transfer rates continue to increase, it is still more efficient to read or write large amounts of data from or to a contiguous area of the disk rather than several, smaller locations scattered around the disk. However, file sizes are driven by the amount of data within the file, not the desire to enhance data transfer rates. Thus, an application that manipulates multiple, smaller portions of data as individual files has, until now, been plagued with the problem that the individual files tend to become scattered and discontiguous on disk, thereby degrading data transfer and access performance.

To address that problem, defragmenting utilities are available that may be executed periodically to defragment files and to relocate files that tend to be used together near each other on the disk. However, defragmenting utilities are generally only executed periodically. For that reason, the fragmentation and scattering of files is a problem that typically grows over time between the execution of defragmenting utilities, which may be months.

In addition, some applications manipulate very large data files that contain smaller portions that are separable in some manner. It is a disadvantage to those applications that the smaller portions are contained within the very large data file because the smaller portions are not individually accessible. However, breaking the large data file into individual smaller data files may result in the information being fragmented on the disk, which introduces the above-identified problems resulting from the fragmentation.

SUMMARY OF THE INVENTION

Briefly stated, the present invention allows an application program to write, as a single file, a large block of data comprising multiple portions that could otherwise be written as several smaller files, and then to access, as individual files, each of the portions within the large block of data. Moreover, each of these embedded files can be efficiently converted to individual files. The invention may be partially embodied in a file system that includes a database of records, such as a Master File Table, that essentially defines each file stored on a volume. One example of such a file system is the NTFS® file system associated with the Windows® 2000 operating system. The application program writes, via the file system, a single file to the volume as (preferably) a contiguous block of data. The single file includes two or more separable streams of data capable of being stored as individual files (subfiles). Once the single file is written to the volume, in contrast to existing file systems, multiple entries may be made to the database of records to subdivide the monolithic file into the set of constituent files. Each such record defines and points to a subfile within the single file. The subfiles may be positioned within the single file such that the beginning of each subfile lies on the beginning of an allocation unit. In this manner, the single file may be written to the volume in one efficient operation, yet each subfile ends up being individually accessible via its respective entry in the database of records.

The invention overcomes the limitations of the prior art by allowing applications and utilities to write several files to a disk as a single file-write operation, yet, after conversion, to individually access the several files. Another example is a program that typically maintains large data files containing relatively-separable chunks of data, such as various users' data maintained by an e-mail server program. The invention allows such a program to manipulate its data as a larger data file, and then to save the data as smaller, individually-accessible data files. In yet another example, the invention allows files that are generally accessed separately to be aggregated on disk in a common location, which results in improved performance when accessing more than one of the separate files at the same time.

These and other aspects of the invention, together with the benefits and advantages realized, will become apparent from a reading of the following detailed description in conjunction with the drawings, in which:

DETAILED DESCRIPTION

Exemplary Operating Environment

Figure 1:
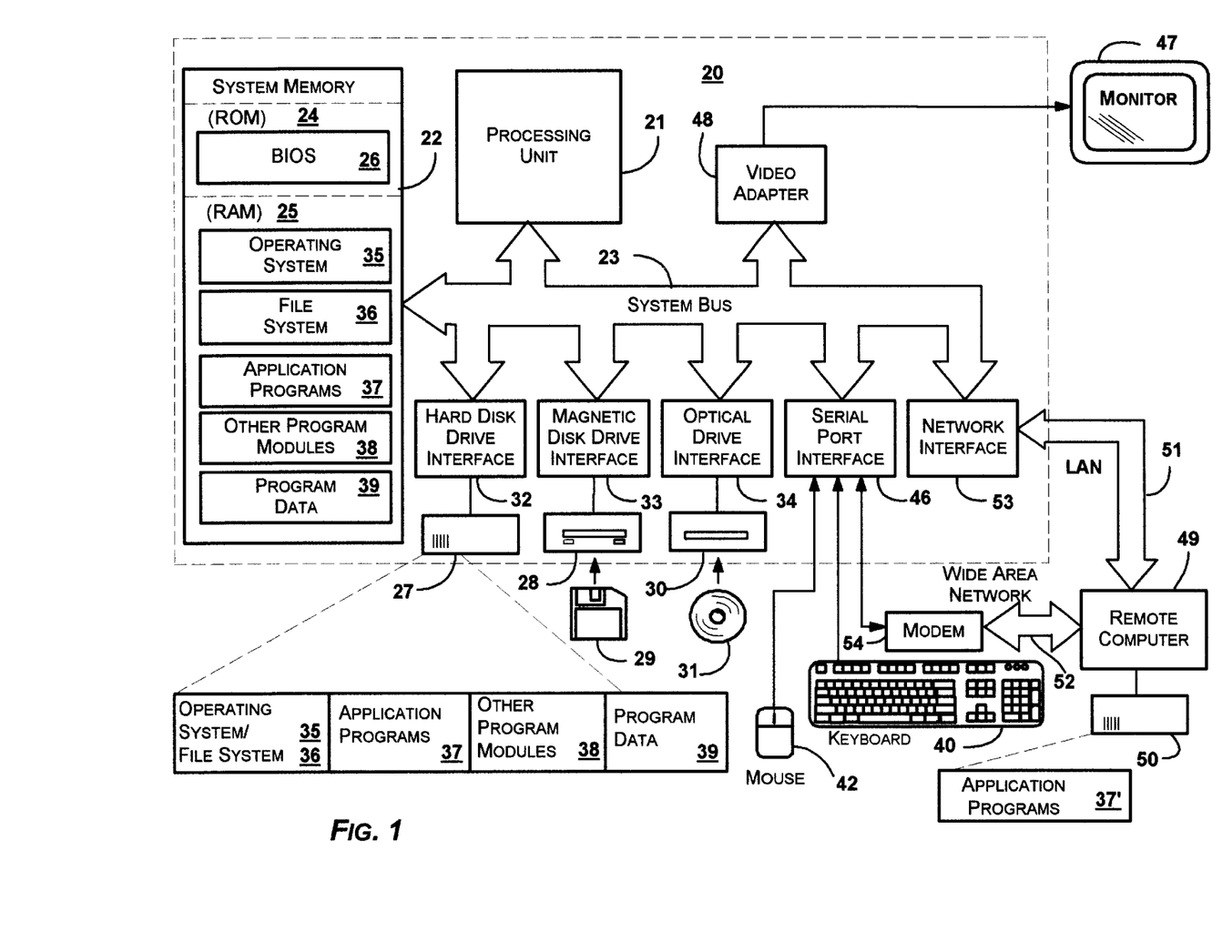
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as the Windows® 2000 operating system) The computer 20 includes a file system 36 associated with or included within the operating system 35, such as the Windows NT® (now Windows® 2000) File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Storing Multiple Files in Contiguous Allocations

Figure 2:
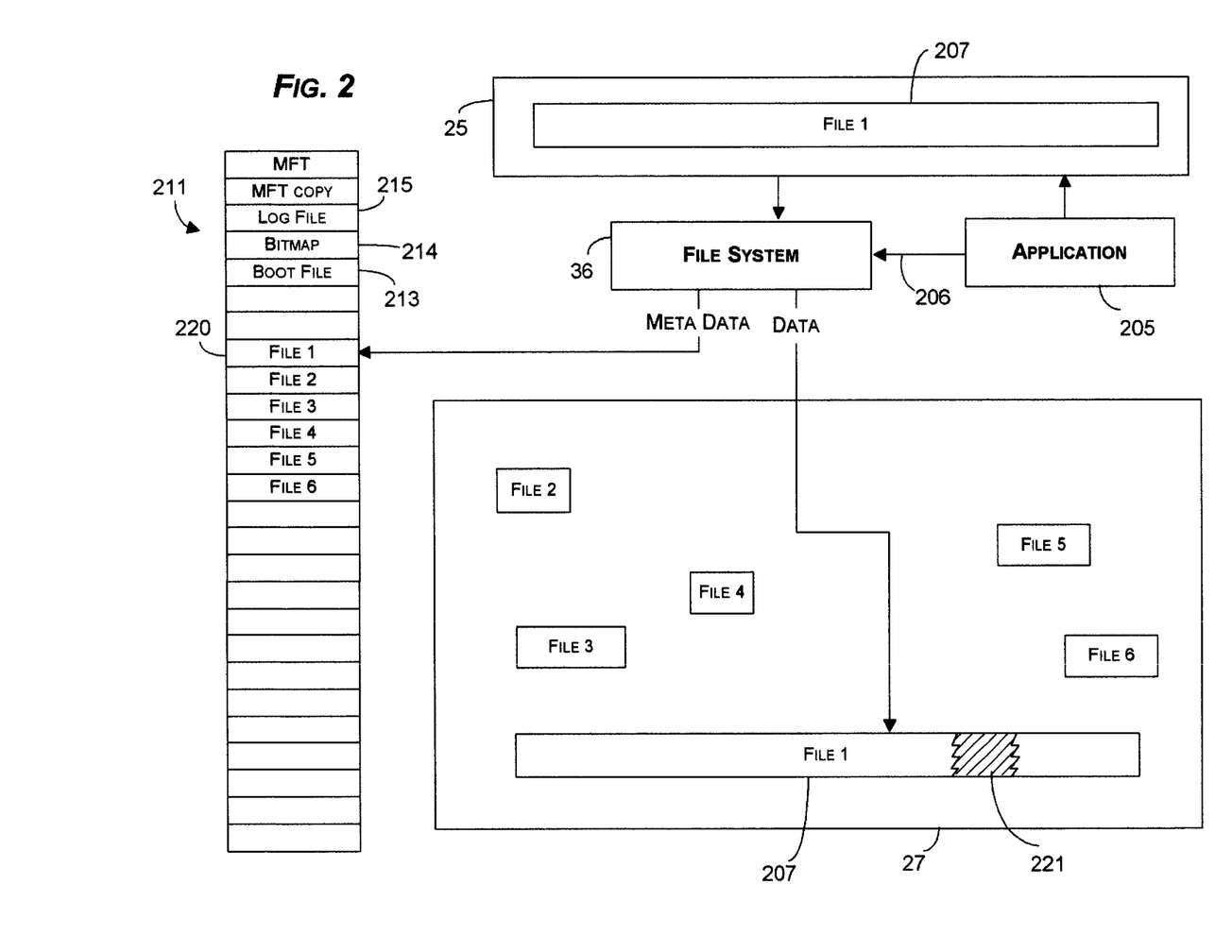
FIG. 2 is a functional block diagram generally illustrating the writing of a large, single file to a hard disk by a file system configured in accordance with one aspect of the present invention.

FIG. 2 is a functional block diagram illustrating a write of a single, large file (File 1, or 207) to a hard disk 27 by an application 205. Illustrated are system RAM 25, a file system 36 (modified in accordance with the present invention), an application 205, a hard disk 27, and a database 211 that generally describes the information stored on the hard disk 27 by the file system 36. The file system 36 may be a driver in the operating system 35 that controls access to the hard disk 27 by application programs 37 (FIG. 1), such as the application 205. The application program 205 reads from and writes to the hard disk 27 by issuing requests to the file system 36, which then performs the actual file access.

In one actual implementation, the file system 36 makes use of a database, such as a Master File Table (MFT) 211, that contains multiple records, each record describing a file on the hard disk 27. The MFT 211 may contain additional records, such as a record for a boot file 213, a bitmap file 214, a log file 215, and other records (not shown) which are used by the file system 36 to manage information stored on the hard disk 27. It should be noted that this example illustrates the hard disk 27 as containing a single volume. However, it will be appreciated that the hard disk 27 may contain multiple volumes, each volume having its own MFT 211. Additional information on a preferred file system, the NTFS file system, may be found in Helen Custer, *Inside the Windows NT File System*, Microsoft Press (1994).

Generally, the application 205 manipulates data in RAM 25 as a single data file, such as File 1 207. The application 205 may keep an entire file or only a portion of the file in RAM 25 while the data is being manipulated. When the application 205 is instructed to save the data, the application 205 passes a write request 206 to the file system 36 instructing it to write the data to the hard disk 27. For example, in the Windows® 2000 operating system, this is accomplished by placing an application program interface (API) call to the operating system, whereby an I/O manager component sends an I/O request packet (IRP) to the file system 36.

The file system 36 performs the write operation in two general steps. In one step, the file system 36 writes the data associated with the file in RAM 25 to the hard drive 27. In another step, the file system 36 writes metadata about the file in RAM 25 to the MFT 211. The file system 36 may also log the operation. As mentioned above, the MFT 211 contains records, such as record 220, for each file on the hard disk 27. Each record includes several attributes of its associated file, such as standard information, an attribute list, a filename, a security descriptor, and file data. It should be noted that, for very small files, the record in the MFT 211 could contain all the data associated with the file. However for larger files, the MFT record 220 includes attributes associated with the file, and one or more pointers to locations on the hard disk 27 where the data associated with the file is stored.

In this example, File 1 (207) is a large, single file and may be written to the hard drive 27 as contiguous data. The file system 36 may try to find contiguous storage space that will hold the entire file, but such is not always possible. In some situations, the data associated with File 1 (207) may be fragmented and written to two or more extents on the hard disk 27. The metadata associated with File 1 (207) is written to. a single record 220 in the MFT 211. This configuration provides the benefit of having the information associated with File 1 (207) stored as much together as possible, considering the availability of contiguous allocation units or clusters on the hard disk 27. However, the application 205 still does not enjoy the benefits associated with maintaining a small portion of data, such as stream 221, as an individual file.

Figure 3:
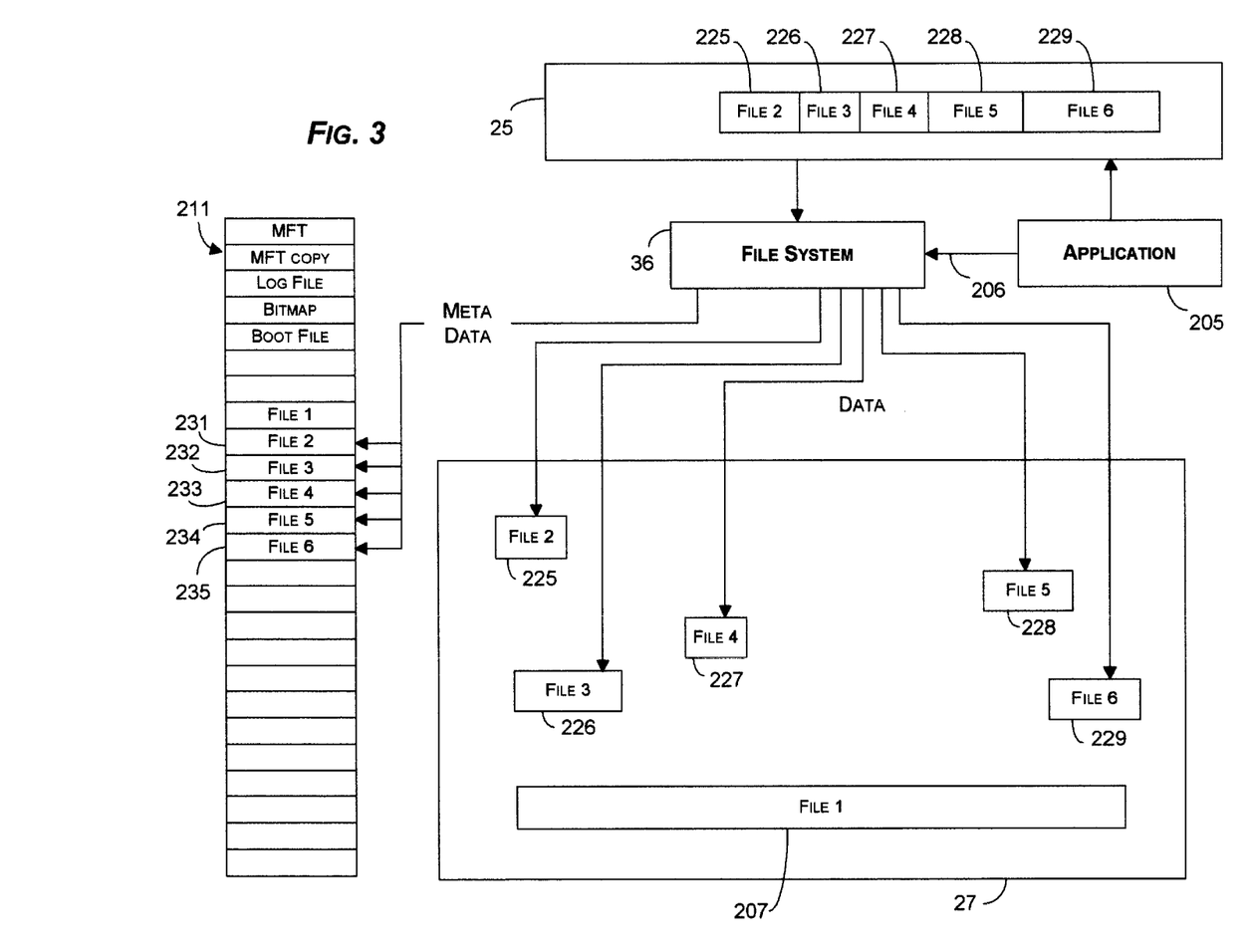
FIG. 3 is a functional block diagram generally illustrating the writing of multiple smaller files to a hard disk by a file system configured in accordance with one aspect of the present invention.

FIG. 3 illustrates a different situation where the application 205 manipulates multiple small files (File 2 (225), File 3 (226), File 4 (227), File 5 (228), and File 6 (229)). As with the example illustrated in FIG. 2, the application 205 issues a request 206 to write the data from RAM 25 to the hard disk 27. In this situation, the file system 36 writes each of the multiple small files from RAM 25 to the hard disk 27 as individual files. Likewise, the file system 36 writes multiple records (record 231, record 232, record 233, record 234, and record 235) to the MFT 211. Record 231 in the MFT 211 contains the metadata associated with File 2 (225), and a pointer to the location of the data associated with File 2 (225) stored on the hard disk 27. Similarly, records 232–235 contain the metadata associated with File 3–File 6 (respectively) and pointers to the data associated with those files on the hard disk 27.

The configuration illustrated in FIG. 3 provides the benefit of more efficient access to a smaller portion of the data owned by the application 205. For example, to access or otherwise maintain data within File 4 (227), the application 205, via the file system 36, retrieves from record 233 a pointer directly to the data associated with File 4 (227). However, if the application 205 attempts to access more information than just that stored in one file, such as the information stored in three or four files, the situation becomes much less efficient. For instance, the file system 36 must access the MFT 211 to retrieve pointers from multiple records associated with each of the several files, and then retrieve the data associated with those several files from various locations on the hard disk 27. Physically, the disk read/write head needs to jump around to seek the various locations on the disk. The result is a performance degradation that increases with the number of files accessed, and as contiguous free space on the hard disk 27 becomes less available.

Figure 4:
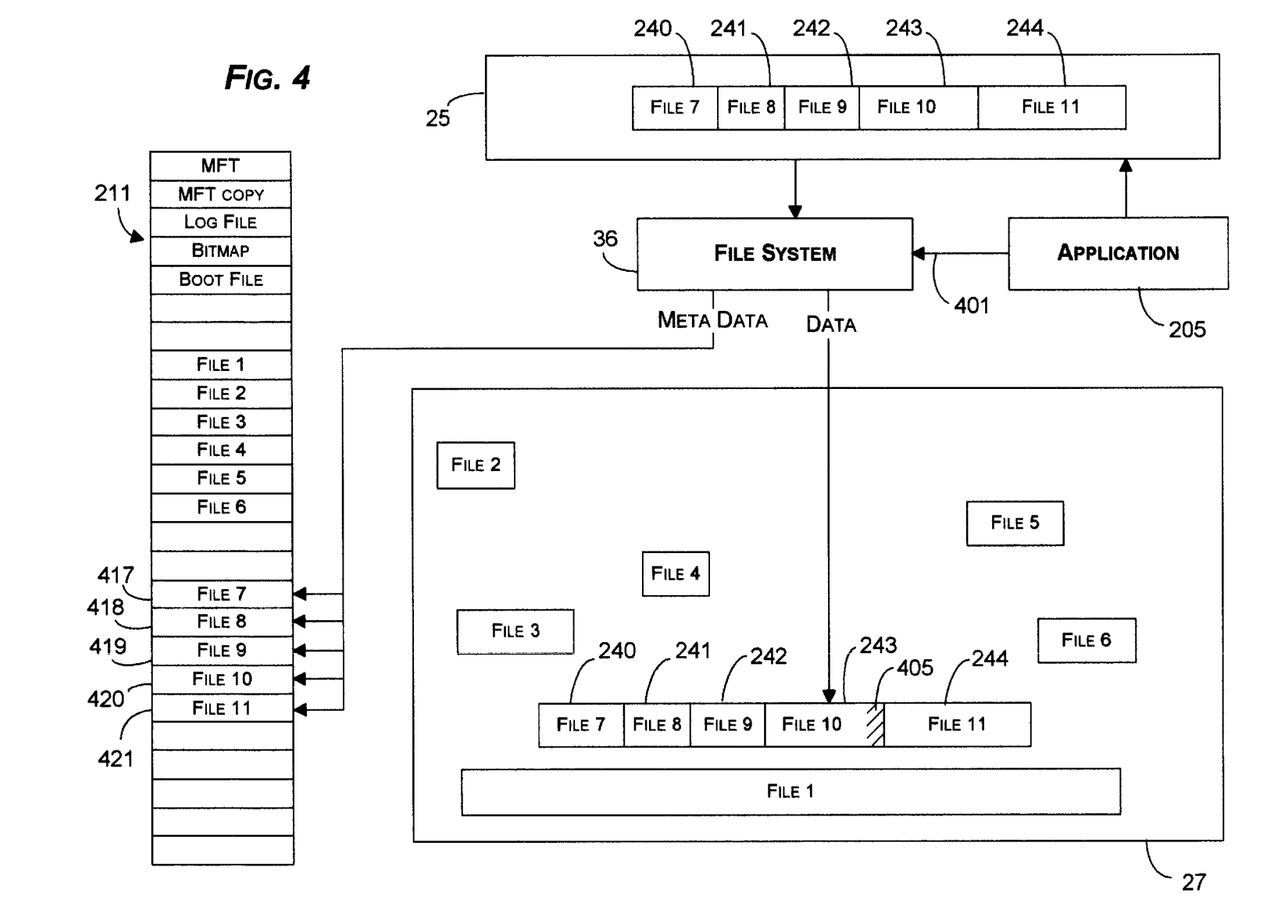
FIG. 4 is a functional block diagram generally illustrating the writing of multiple, smaller files to a hard disk as a single, larger file by a file system configured in accordance with one aspect of the present invention.

FIG. 4 illustrates an alternative data storage technique made easier through one implementation of the present invention. In accordance with the disclosed embodiment, the application 205 may maintain the data as a large, single file that contains multiple smaller portions of data (e.g., File 7 (240), File 8 (241), File 9 (242), File 10 (243), and File 11 (244)). Each smaller portion of data may be related such that it would be advantageous to store the smaller portions together on the hard disk 27 to lessen the time necessary to access the information if it were stored in two or more files. However, the smaller portions may be distinct enough that the application 205 may routinely attempt to access only the information stored in one portion. For those reasons, it would be advantageous to store each smaller portion as a separately accessible file on the hard disk 27. Likewise, if stored as separate files, the smaller portions may be manipulated by other application programs 37 as individual files.

One common example where both of these advantages are desirable is the case of an email server's data, such as stored by the Microsoft® Exchange Server application program, developed and licensed by the Microsoft® Corporation of Redmond, Wash. Often, an email server will maintain very large files containing multiple email accounts for multiple users of the email server. In that case, the performance of the email server is enhanced by storing the information for each of the email accounts in contiguous locations on the hard disk 27, thereby enabling the email server to read as much contiguous information as practical. However, the several users of the email service may desire access to the information contained within their individual email accounts as separate files. In that case, the desires of the several users may be met by storing the information for each email account as a separate file on the hard disk 27.

Figure 7:
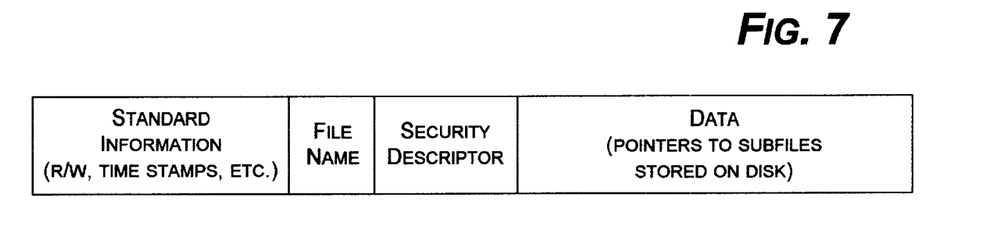
FIG. 7 is an illustration of a typical construct of an MFT record that describes a file stored on a hard disk.

To accommodate those two generally competing interests, one implementation of the invention enables the application 205, in cooperation with the file system 36, to write its data from RAM 25 to the hard disk 27 as one file, but still access smaller portions of the data stream as individual files. The application 205 manipulates its data in RAM 25 as a single file, however, the application 205 maintains additional "meta information" associated with each smaller portion of the single file ("subfiles"). The subfiles are the smaller portions of the larger, single file intended to be stored on hard disk 27 as separately-accessible individual files. Thus, the meta information maintained by the application 205 for each subfile is similar to the meta data stored in each record of the MFT 211. The meta information for each subfile may include a file name for the subfile, read/write privileges for the subfile, a security descriptor that specifies the users that may access the subfile, time stamp information associated with the subfile, and the like. FIG. 7 is an illustration of a typical construct of a record stored in the MFT 211 that describes a file stored on the hard disk 27.

The file system 36 is configured to allow the application 205 to pass a request 401 to write the subfiles to the hard disk 27 as one contiguous (to the extent contiguous space is available) data stream, but to write multiple records to the MFT 211, each record having a pointer to the location of one of the subfiles on the hard disk 27, and the meta information associated with the one subfile. In this manner, the information contained within each of the subfiles will be contiguous on the hard disk 27 (to the extent contiguous space is available) making access of large portions of the information (e.g., multiple subfiles) more efficient. In addition, by identifying each of the subfiles as a separate file in the MFT 211, the application 205 (or another application program 37 or program module 38) may separately read from, write to, modify, or otherwise access the subfiles.

The following example further illustrates the described implementation. The application 205 maintains some relatively large amount of data in RAM 25, along with meta information that describes multiple subfiles within the large amount of data. The application 205 issues a request 401 to the file system 36 to write the data from RAM 25 (e.g., File 7–File 11) to the hard disk 27. The file system 36 responds by writing the entire stream of data from RAM 25 to the hard disk 27 as a single data stream, as if the data were a single file. The file system 36 does not, however, write only one single record to the MFT 211 describing the single data stream. Rather, the file system 36 writes a separate record (e.g., record 417–record 421) to the MFT 211 for each subfile (e.g., File 7–File 11) as specified by the application. Each record includes the meta information maintained by the application 205 about the subfile associated with the record.

It should be noted that the larger, single file may not be written as one continuous data stream or written to disk at one time. It will be appreciated that file systems often cache data before committing to disk, write data to disk in streams of a pre-determined size regardless of the amount of data, may postpone writing data for other performance reasons, may create chunks of data that are written at different times, or otherwise write the data to disk in a manner other than as a single, continuous data stream. Likewise, enough contiguous space is not always available to keep the subfiles adjacent to each other, or even unfragmented themselves. Thus, actual implementations are susceptible to many alterations in the manner in which the data is written to disk without deviating from the spirit of the invention.

In this way, each of the subfiles is essentially "converted" from a separate stream of data within a larger, single file into a smaller, individual file. The result is a much more efficient use of resources. For instance, the file system 36 essentially writes the data associated with each of the several subfiles to the hard disk 27 at one time, and then creates each of the several MFT records at one time, thereby reducing the time spent seeking back and forth between the MFT 211 and the data portion of the hard disk 27, as would be the case if each of the subfiles were written out individually. In addition, when the information is later read by the application 205, each of the subfiles (now actual files) are closely located on the hard disk 27 which reduces the time that would otherwise be spent seeking files that are likely scattered on the hard disk 27. Moreover, even though initially written as one large data stream, each of the subfiles is separately accessible by the application 205, or any other application, as an individual file.

To facilitate the creation of files out of the subfiles with no data copying, the beginning of each subfile should coincide with a boundary between two allocation units (e.g., clusters) when written to the hard disk 27. A cluster is commonly a unit of storage allocation for the hard disk 27, and thus as used herein, the allocation unit will be referred to as a cluster for purposes of simplicity, although as can be readily appreciated, other allocation units (e.g., two clusters, a half a cluster, one or more sectors) are feasible. Formatting the subfiles is described in detail below with respect to FIG. 6. Briefly described, when formatting each of the several subfiles (Files 7–File 11) in RAM 25, the application 205 may insert a buffer or lit empty data between two subfiles (e.g., referring to FIG. 4, buffer 405 between File 10 and File 11) so that when the data is written to hard disk 27, each subfile begins on a cluster boundary.

Figure 5:
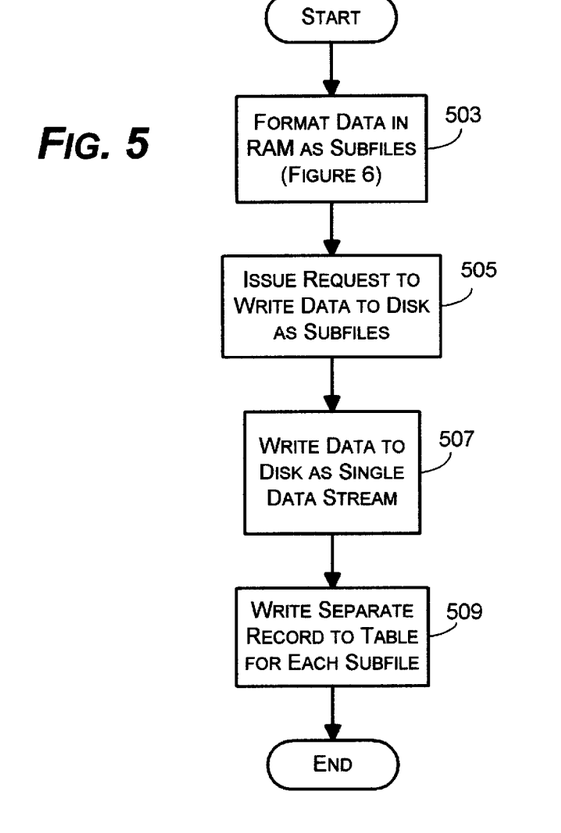
FIG. 5 is a logical flow diagram generally illustrating a process performed by one implementation of the invention to write a series of subfiles to disk as a single, larger file.
Figure 6:
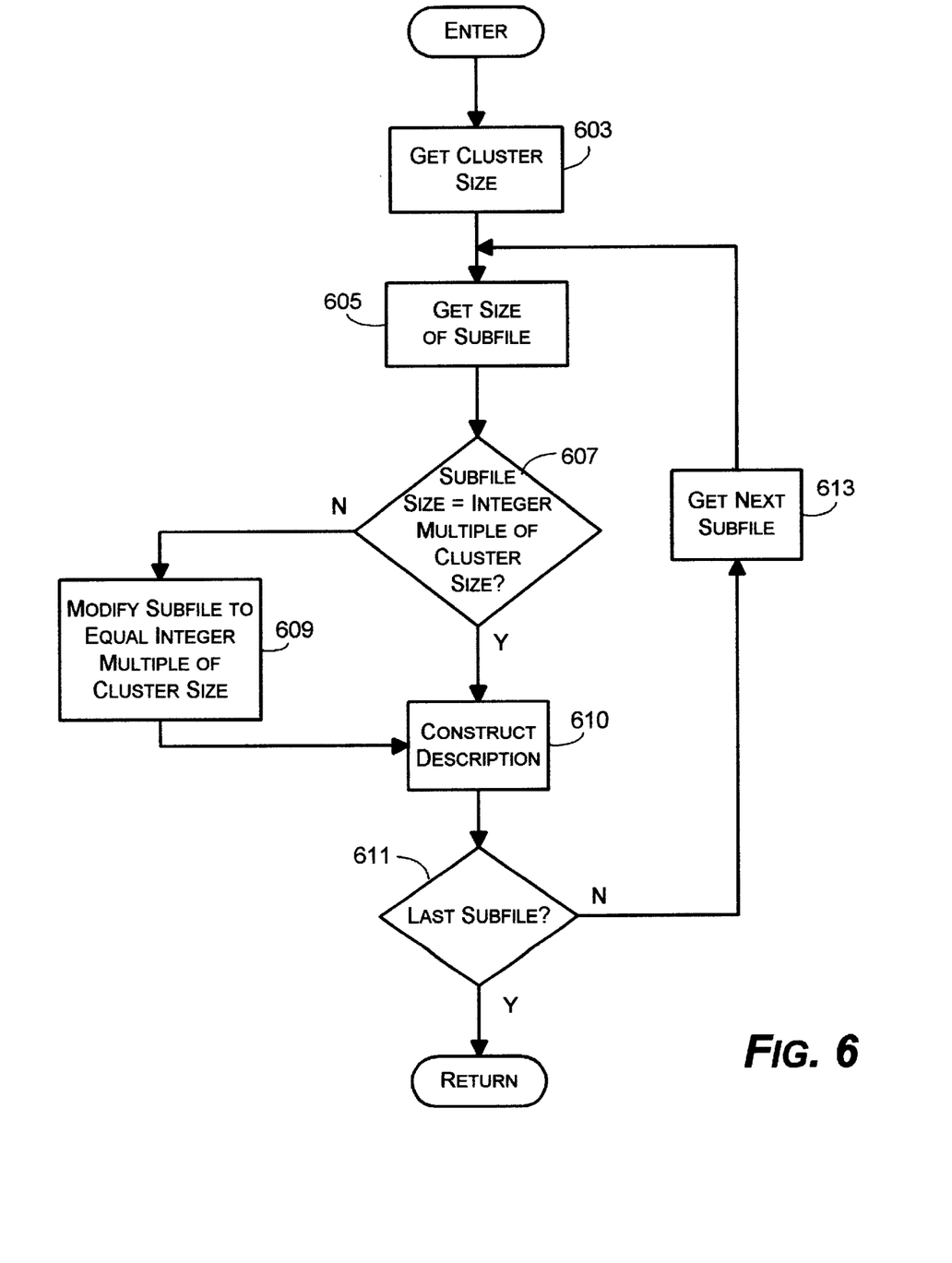
FIG. 6 is a logical flow diagram generally illustrating a process performed by an application program configured in accordance with one aspect of the present invention to format a series of subfiles to be written to disk as a single, larger file.

FIGS. 5 and 6 are logical flow diagrams that generally illustrate processes performed by one implementation of the invention. Beginning with FIG. 5, a process is illustrated that may be performed by the file system 36 in conjunction with the application 205 to write the application's data from RAM 25 to hard disk 27 in the manner described above. At block 503, the application 205 formats the data in RAM 25 as subfiles. Formatting the data in RAM 25 is illustrated in detail in FIG. 6 and described below. Briefly stated, the application 205 arranges the data in RAM 25 such that each portion of the data intended to be a subfile begins on a cluster boundary. The application 205 may also construct a description (e.g., size, offset in the stream, filename, attributes) for each subfile to provide to the file system 36.

At block 505, the application 205 issues a request to write the data from RAM 25 to the hard disk 27 as subfiles. The request may take the form of one or more API calls resulting in one or more corresponding I/O Request Packets (IRPs) being sent to the file system 36. The application 205 may pass with the request a description of each subfile in RAM 25, such as the length and starting point of each subfile.

At block 507, the file system 36 responds to the request issued by the application 205 by writing the data to the hard disk 27 as a single data stream. It will be appreciated that the file system 36 will ordinarily attempt to write the data stream to contiguous clusters to the extent that contiguous clusters are available. In other words, by writing the data at one time, the data is most likely to be contiguous or, at least, closely located in a small number of sets of contiguous clusters on the hard disk 27.

At block 509, the file system 36 writes separate records for each subfile to the data structure that describes the volume of files on the hard disk 27, in this case the MFT 211. In this way, the data is written from RAM 25 to the hard disk 27 in one operation as a single data stream, and a separate record for each portion of the data intended as a subfile is written to the MFT 211 to create each of the individual files. The result (illustrated in FIG. 4) is that each of the subfiles are closely located on the hard disk 27, yet are still accessible by the application 205 or other application programs 37 as (now) individual files.

FIG. 6 is a logical flow diagram generally illustrating a process performed by the application 205 to format the data in RAM 25 so that it may be written to the hard disk 27 as a single data stream. Beginning at block 603, the application 205 first determines the cluster (or other allocation unit) size of the hard disk volume. The cluster size is a characteristic of the hard disk volume that generally defines the size of the smallest accessible unit of allocation on the hard disk 27. The cluster size may be assigned by the file system 36, for example, based on the overall storage space of the hard disk 27. A common cluster size used for many hard disks is 4 KB. Thus, the application 205 may query the file system 36 to identify the cluster size.

At block 605 the application 205 identifies the size of the first portion of the data in RAM 25 intended to be a subfile. For example, if the application 205 is an email server, the application 205 may identify individual email accounts as subfiles. In that case, the application 205 may identify the subfile size of the data associated with one individual email account.

At decision block 607, the application 205 determines whether the subfile size is equal to an integer multiple of the cluster size identified at block 603. If the subfile size is not equal to an integer multiple of the cluster size, the application 205 modifies the subfile (such as by adding a padded region of zeros after the subfile) to equal an integer multiple of the cluster size. For instance, if the cluster size of the hard disk 27 is 4 KB, the application 205 may add zeros after the subfile (in RAM 25) until the subfile and the padded region have a length equal to an integer multiple of 4 KB. To achieve that goal, the application 205 may move data in the stream that follows the selected subfile forward in the file (increasing the size of the stream) so the next subfile (e.g., File 11) starts at the next cluster boundary. The application may then write zeros between the two subfiles (i.e., File 10 and File 11). In that way, the next subfile (i.e., File 11) will begin on a cluster boundary when written to the hard disk 27. Alternatively, the file system 36 may provide to the application 205 a mechanism by which the application 205 may allocate a selected amount of storage space equal to an integer multiple of the cluster size while also specifying a file size less than the allocated space. In this manner, the file may have room to grow within the allocated storage space. The process then proceeds to decision block 610.

Block 610 represents the construction of the description used by the file system, such as the size of the subfile, its offset in the stream, filename, and so forth. Note that this may be previously constructed, however, if so, it may be modified to reflect a size change resulting from ending the subfile on a cluster boundary.

At decision block 611, a determination is made whether the current subfile being evaluated is the last subfile of the data in RAM 25. If so, the process is finished and returns to block 503 of FIG. 5. If more subfiles remain to be evaluated, the process continues at block 613.

At block 613, the application 205 identifies the next portion of the data in RAM 25 intended as a subfile and returns to block 605 where the size of the that portion is identified. The process then continues again as described above. The process repeats, until each subfile has been evaluated and modified, if necessary. When the last of the subfiles has been evaluated, the process returns to block 503 illustrated in FIG. 5.

The implementation of the invention described above is subject to many practical uses. One practical use has already been described, that being an email server application taking advantage of the described implementation to manipulate information for several email accounts in RAM essentially as a single file, yet store the information for individual email accounts as separate files on disk. Another practical use of the described implementation involves the backup and restore of data stored on hard disk. The application described above may alternatively be configured to facilitate the backup and restore of data stored on the hard disk by allowing a user to identify several files as candidates for backup in a given session. The application may then access each of the several candidate files and create one (likely very large) data file with the appropriate meta information (e.g., an internal catalog) to determine where each file is located within the larger file and what attributes (i.e., file name, security information, and the like) are associated with each file. The application may then instruct the file system to write the large file to the hard disk in accordance with the implementation described above, thereby causing the individual files to be closely arranged (as much as practical) on the hard disk. In that way, the actual backup procedure can achieve high data rates because the candidate files are arranged as essentially a single file to be written to the backup media.

During a restore operation, the meta data associated with each of the smaller files may be used by a backup application to restore each smaller file to the hard disk. Likewise, a "selective restore" may also be possible by extracting an individual file from the backup media through the use of the meta information present in the catalog part of the file. In this sense, the meta data is analogous to an index of the smaller files that makes the complete stream self-describing as to its contents. Thus, the present invention is susceptible of many advantageous uses, as will be appreciated from the above detailed description.

In yet another example, the invention allows files that are generally accessed separately to be aggregated on disk in a single file, which results in improved performance when accessing more than one of the separate files at the same time. For example, a utility may read in a number of spreadsheet applications, aggregate them into a common file, and then write those files out as subfiles of a single data stream. In this way, when a user is working with multiple spreadsheet files, they are closer together on the disk.

While the invention is susceptible to various modifications and alternative constructions, certain illustrated embodiments are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions, comprising:
   creating a first data file containing a plurality of data portions;
   writing the first data file to a non-volatile medium in response to a request to a file system; and
   individually storing descriptive information for each of the plurality of data portions in an information store associated with the non-volatile medium, the descriptive information for each particular data portion including attribute information for the particular data portion that identifies the data portion as a separate data file such that each data portion may be treated as a separate file by programs that provide file-directed requests to the file system.

2. The computer-readable medium of claim 1, wherein creating the first data file includes formatting the plurality of data portions in accordance with a storage characteristic of the non-volatile medium.

3. The computer-readable medium of claim 2, wherein the storage characteristic includes a size of a unit of storage allocation for the non-volatile medium, and wherein formatting the plurality of data portions comprises configuring each data portion in the plurality of data portions to begin on a boundary between two adjacent units of storage allocation on the non-volatile medium.

4. The computer-readable medium of claim 3, wherein the non-volatile medium comprises a hard disk, and wherein the unit of storage allocation comprises a sector multiple.

5. The computer-readable medium of claim 1, wherein creating the first data file includes identifying meta information for each data portion in the plurality of data portions.

6. The computer-readable medium of claim 5, wherein the meta information includes a file name.

7. The computer-readable medium of claim 5, wherein the meta information includes a security descriptor.

8. The computer-readable medium of claim 5, wherein the meta information includes standard information.

9. The computer-readable medium of claim 8, wherein the standard information includes a time stamp, and at least one access privilege.

10. The computer-readable medium of claim 1, wherein the first data file is written to the non-volatile medium as a continuous data stream.

11. The computer-readable medium of claim 1, wherein storing descriptive information includes writing meta information to an entry in the information store to identify a data portion in the plurality of data portions.

12. The computer-readable medium of claim 11, wherein the meta information includes a pointer to the associated data portion within the first data file written to the non-volatile medium.

13. The computer-readable medium of claim 1, further comprising recreating the first data file by:
   reading the stored descriptive information for each of the plurality of data portions from the information store; and
   storing new descriptive information that describes the recreated first data file containing the plurality of data portions.

14. A computer-readable medium having computer-executable components, comprising:
   a data store describing files stored on a disk; and
   a file system configured to receive an instruction from a program to write data to the disk in a single data stream, and further configured to write a plurality of entries to the data store, each entry in the plurality of entries describing a subfile within the single data stream that via the entry is accessible as a separate file by programs that provide requests to the file system.

15. The computer-readable medium of claim 14, wherein each entry in the plurality of entries comprises metadata associated with a selected subfile within the single data stream.

16. The computer-readable medium of claim 15, wherein the metadata includes a file name.

17. The computer-readable medium of claim 15, wherein the metadata includes a pointer to a location on the disk where the selected subfile is stored.

18. A computer-readable medium having stored thereon data structures, comprising:
   a first data structure including two or more data fields, each data field including information, the first data structure having been written to the computer-readable medium as a continuous data stream;
   a second data structure containing a plurality of records, each record describing a file stored on the computer-readable medium, a selected one record describing a first data field in the first data structure such that the first data field is accessible as a first individual file maintained by a file system from a program's perspective, a selected other record describing a second data field in the first data structure such that the second data field is accessible as a second individual file maintained by the file system from the program's perspective, the selected one record and the selected other record having been written to the second data structure in conjunction with the first data structure having been written to the computer-readable medium.

19. The computer-readable medium of claim 18, wherein the first data structure comprises a single file, the data of which is written to the computer-readable medium as a single data stream.

20. The computer-readable medium of claim 18, wherein the second data structure comprises a database associated with the computer-readable medium.

21. The computer-readable medium of claim 20, wherein the database comprises a Master File Table.

22. The computer-readable medium of claim 18, wherein each record of the second data structure includes information that describes an associated file stored in association with the computer-readable medium.

23. The computer-readable medium of claim 22, wherein the information includes a file name and a pointer to the file associated with the data field containing the attributes.

24. A computer-implemented method, comprising:
   receiving a request to create multiple separate files from a source file, the source file containing a plurality of data portions;
   in response to the request, writing the source file to a non-volatile medium, the non-volatile medium having an associated data store containing an entry for each file stored on the non-volatile medium; and
   writing a plurality of entries to the data store, each entry in the plurality corresponding to one of the plurality of data portions to identify that particular data portion as a separate data file to programs that access data files via file system requests.

25. The computer-implemented method of claim 24, wherein the request to create multiple files comprises an application program interface call.

26. The computer-implemented method of claim 24, wherein writing the source file to the non-volatile medium comprises writing the plurality of data portions contained within the source file prior to writing the entries to the data store associated with the non-volatile medium.

27. The computer-implemented method of claim 24, wherein each entry in the plurality of entries written to the data store includes an attribute associated with the data portion corresponding to the entry.

28. The computer-implemented method of claim 27, wherein the attribute comprises a file name.

29. The computer-implemented method of claim 27, wherein the attribute comprises a security descriptor.

30. The computer-implemented method of claim 27, wherein the attribute comprises a time stamp.

31. The computer-implemented method of claim 27, wherein the attribute comprises an access privilege.

32. The computer-implemented method of claim 27, wherein the attribute comprises a pointer to a location on the non-volatile medium where the corresponding data portion has been written.

33. The computer-readable medium of claim 13 wherein recreating the first data file further comprises, reading each of the plurality of data portions described by the stored descriptive information.

34. A computer-readable medium having computer-executable instructions for performing the method of claim 24.

35. In a computer system, a method comprising:
   at a file system, receiving a single request from a program directed to writing a set of data to a storage medium, and receiving information from the program indicative of a plurality of subfiles within the set of data;
   in response to the request, writing the set of data to the storage medium; and
   for each subfile, writing information to a data store associated with the storage medium, the information converting each subfile into a separate file that is accessible by programs via file system requests to the file system.

36. The method of claim 35 further comprising, at the file system, receiving a request to open a named file that corresponds to one of the subfiles, and in response, reading the information for that subfile from the data store to open the named file.

37. The method of claim 35 further comprising, at the file system, combining a selected set of at least two of the subfiles into a combined single data file by reading the information for each subfile of the selected set from the data store, and storing new descriptive information that describes the combined single data file.

38. A computer-readable medium having computer-executable instructions for performing the method of claim 35.

39. In a computer system having a file system that maintains a data store containing metadata that describe each file of a set of files maintained by the file system, a method comprising, receiving from a program a request directed to combining a plurality of files into a single file, and in response to the request, combining the plurality of files into a single file by reading the metadata for each of the plurality of files from the data store, and based on the metadata that was read, storing new metadata in the data store that describes the single data file without necessarily reading actual data of the file.

40. A computer-readable medium having computer-executable instructions for performing the method of claim 39.

* * * * *